United States Patent
Mäkelä

(10) Patent No.: US 8,332,532 B2
(45) Date of Patent: Dec. 11, 2012

(54) CONNECTIVITY OVER STATEFUL FIREWALLS

(75) Inventor: Antti Mäkelä, Tampere (FI)

(73) Assignee: TeliaSonera AB, Stockholm (SE)

( * ) Notice: Subject to any disclaimer, the term of this patent is extended or adjusted under 35 U.S.C. 154(b) by 800 days.

(21) Appl. No.: 11/663,098

(22) PCT Filed: Jun. 7, 2006

(86) PCT No.: PCT/FI2006/050238
§ 371 (c)(1),
(2), (4) Date: Mar. 15, 2007

(87) PCT Pub. No.: WO2006/131600
PCT Pub. Date: Dec. 14, 2006

(65) Prior Publication Data
US 2008/0028097 A1    Jan. 31, 2008

(30) Foreign Application Priority Data
Jun. 7, 2005   (FI) .................................. 20055295

(51) Int. Cl.
G06F 15/16    (2006.01)
(52) U.S. Cl. ........................................ 709/237; 709/228
(58) Field of Classification Search ................... 709/227, 709/237, 238, 239
See application file for complete search history.

(56) References Cited

U.S. PATENT DOCUMENTS

| | | | |
|---|---|---|---|
| 6,088,796 A | 7/2000 | Cianfrocca et al. | |
| 2002/0103998 A1* | 8/2002 | DeBruine | 713/153 |
| 2003/0009571 A1 | 1/2003 | Bavadekar | |
| 2003/0051155 A1* | 3/2003 | Martin | 713/201 |
| 2005/0021939 A1 | 1/2005 | Le et al. | |
| 2005/0125532 A1* | 6/2005 | Kimchi | 709/225 |

FOREIGN PATENT DOCUMENTS

| WO | WO 02/27434 | 4/2002 |
|---|---|---|
| WO | WO 02/071717 A2 | 9/2002 |

OTHER PUBLICATIONS

Guha Saikat; Takeda Yutaka; Francis Paul: NUTSS: A SIP-based approach to UDP and TCP network connectivity: Proceedings of the ACM SIGCOMM 2004 Workshops; Portland, OR, United States, Aug. 30, 2004-Sep. 3, 2004, pp. 43-48; XP002397377.

* cited by examiner

*Primary Examiner* — Ian N Moore
*Assistant Examiner* — Afshawn Towfighi
(74) *Attorney, Agent, or Firm* — Cozen & O'Connor

(57) ABSTRACT

A method for establishing a TCP connection between two client terminals protected by stateful firewalls and comprising means for sending messages to each other via a messaging server. The client terminals agree on establishing a mutual TCP connection by sending a message, which indicates port numbers to be used on said connection. A TCP connection establishment procedure is started in both client terminals. After sending a first handshake message, a message indicating a sequence number of the first handshake message is sent from both client terminals to each other. When the firewalls of the opposite client terminals reject the first handshake message, an acknowledgement message to the first handshake message is created in both client terminals using a raw socket, which acknowledgement message includes the received sequence number as an acknowledgement number. Finally, the raw socket based acknowledgement message is sent to the opposite client terminal for completing the establishment of the TCP connection.

11 Claims, 2 Drawing Sheets

CONNECTIVITY OVER STATEFUL FIREWALLS

PRIORITY CLAIM

Figure 1:
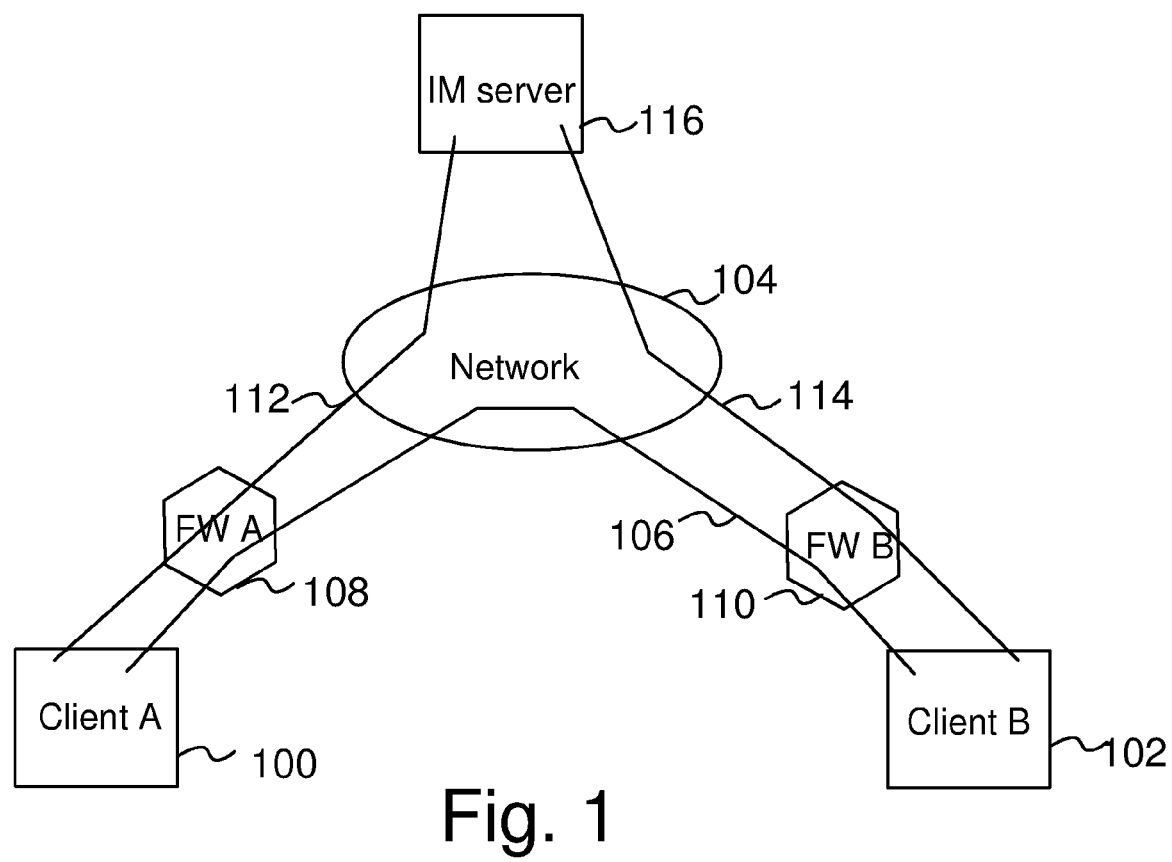

This is a U.S. national stage of application No. PCT/FI2006/050238, filed on 7 Jun. 2006. Priority is claimed on the following application: Country: Finland, Application No.: 20055295, Filed: 7 Jun. 2005, the content of which is incorporated herein by reference.

FIELD OF THE INVENTION

The present invention relates to communication networks, and more particularly to connectivity over stateful firewalls.

BACKGROUND OF THE INVENTION

Security is becoming a more and more important issue in communication networks. Accordingly, more and more computers are secured by a firewall. A firewall controls, for instance, the operation of computer ports and filters the information coming through the Internet connection into the computer. When a so-called stateful inspection is used in a firewall, the contents of each data packet is not examined but instead the firewall compares certain key parts of the data packet to a database of trusted information. Outbound information is monitored for specific defining characteristics, and then incoming information is compared to these characteristics. If the comparison yields a reasonable match, the information is allowed through the firewall; otherwise it is discarded.

Even though firewalls improve the security of communication networks, they simultaneously pose more difficulties in establishing a direct connection between two end-user hosts, because nowadays more often computers of both end-users are protected by a firewall. Thus, the parties cannot establish, for instance, a direct TCP connection between each other, since this would currently require that at least one of the hosts of the parties must not have a firewall, whereby the firewalled host may set up connections to the non-firewalled host.

Another solution would be using application-aware firewalls, which has the disadvantage that the configuration of the firewall becomes more complicated since the firewall needs to be aware of all possible applications. A further solution would be using a control protocol, like UPnP (Universal Plug and Play), for controlling the operation of both the firewalls and the host computers. However, a control protocol increases the complexity of the implementation and vulnerability to errors as well. Furthermore, it is typically required that both end-user hosts and their firewalls support the control protocol.

WO02/071717 discloses a method for traversing firewalls, wherein an each end-user communicates to a server proxy and opens a TCP channel. The proxy, in turn, communicates to each party the other parties source address and TCP port. Then the parties start to send packets directly to each other using the source address and port of the proxy, while the proxy is only used for maintaining the TCP state in order to spoof the firewalls. However, the solution of WO02/071717 is not very viable, since most of the network operators have an anti-spoofing setting in their networks, preventing the use of the above-described method. Accordingly, there is a need for an alternative method for traversing firewalls.

SUMMARY OF THE INVENTION

Now there is invented an improved method and technical equipment implementing the method, which is not affected by any anti-spoofing setting in the networks. Various aspects of the invention include a method, a communication system, a client terminal and a computer program, which are characterized by what is stated in the independent claims. Various embodiments of the invention are disclosed in the dependent claims.

According to a first aspect, a method according to the invention is based on the idea of establishing a TCP connection in a network arrangement comprising a first client terminal and a second client terminal, said first client terminal being protected by a first stateful firewall and said second client terminal being protected by a second stateful firewall. Both client terminals also comprise means for sending messages to each other via a messaging server. Initially, the client terminals agree on establishing a TCP connection between each other by sending a message from the first client terminal to the second client terminal via the messaging server, said message comprising at least port numbers of the client terminals to be used on said connection, after which a TCP connection establishment procedure is started in both client terminals. In response to sending a first handshake message of the TCP connection establishment procedure, both client terminals send a message indicating a sequence number of the first handshake message to the opposite client terminal via the messaging server. Then, in response to the firewalls of the opposite client terminals rejecting the first handshake message due mismatch against any rule of the stateful firewalls, an acknowledgement message to said first handshake message is created in both client terminals using a raw socket, the acknowledgement message including the received sequence number as an acknowledgement number. Finally, this raw socket based acknowledgement message is sent to the opposite client terminal for a further acknowledgement according to the TCP connection establishment procedure, said acknowledgement completing the establishment of the TCP connection.

According to an embodiment, the first handshake message of the TCP connection establishment procedure is a TCP SYN packet, whereby the stateful firewalls protecting the client terminals create a rule allowing only a TCP SYN_ACK packet with a corresponding acknowledgement number to be passed through the firewalls in inbound direction.

According to an embodiment, the stateful firewalls protecting the client terminals receive the raw socket based acknowledgement message sent by the opposite client terminal, identify the acknowledgement message as a TCP SYN_ACK packet; and allow the acknowledgement message to be passed through the firewalls in inbound direction in response to the acknowledgement number of the acknowledgement message corresponding to the sequence number of the TCP SYN packet.

The arrangement according to the invention provides significant advantages. By creating the SYN_ACK packets with the raw sockets based on the information of the intermediate IM messages, the client terminals, as well as the firewalls, are deluded to misinterpret the situation as they are having only a unidirectional outbound connection, even though a bidirectional connection is actually established. Furthermore, the clients are operating with their real IP addresses, and no spoofing is required, whereby the arrangement is not affected by any anti-spoofing settings in the network. Yet further, since the embodiments are based on the statefulness of the firewalls, the firewalls do not require any application-awareness functionality or they do not need to support any firewall controlling protocols, such as UPnP, in order to support the embodiments. Thus, the arrangement simplifies the implementation of the firewalls.

According to a second aspect, there is provided a communication system for implementing the above-described arrangement.

According to a third aspect, there is provided a client terminal of a telecommunications system, the client terminal being protected by a stateful firewall, and the client terminal comprising means for sending messages to at least a second client terminal via a messaging server; means for agreeing on establishing a TCP connection to the second client terminal by exchanging messages via the messaging server, at least one of said messages comprising at least port numbers of the client terminals to be used on said connection; means for starting a TCP connection establishment procedure by sending a first handshake message of the TCP connection establishment procedure; means for sending a message indicating a sequence number of the first handshake message to the second client terminal via the messaging server; means for receiving, via the messaging server, a message indicating a sequence number of the first handshake message sent by the second client terminal; means for creating an acknowledgement message to said first handshake message sent by the second client terminal using a raw socket, the acknowledgement message including the received sequence number as an acknowledgement number; means for sending the raw socket based acknowledgement message to the second client terminal; means for receiving a raw socket based acknowledgement message from the second client terminal, said acknowledgement message including the sequence number of the first handshake message sent to the second client terminal; and means for sending an acknowledgement to the received raw socket based acknowledgement message, said acknowledgement completing the establishment of the TCP connection.

According to a fourth aspect, there is provided a computer program product, stored on a computer readable medium and executable in a data processing device, for implementing the means of said client terminal.

LIST OF DRAWINGS

Figure 3:
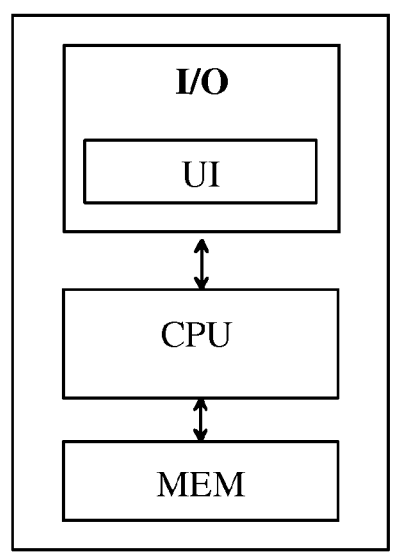
Figure 2:
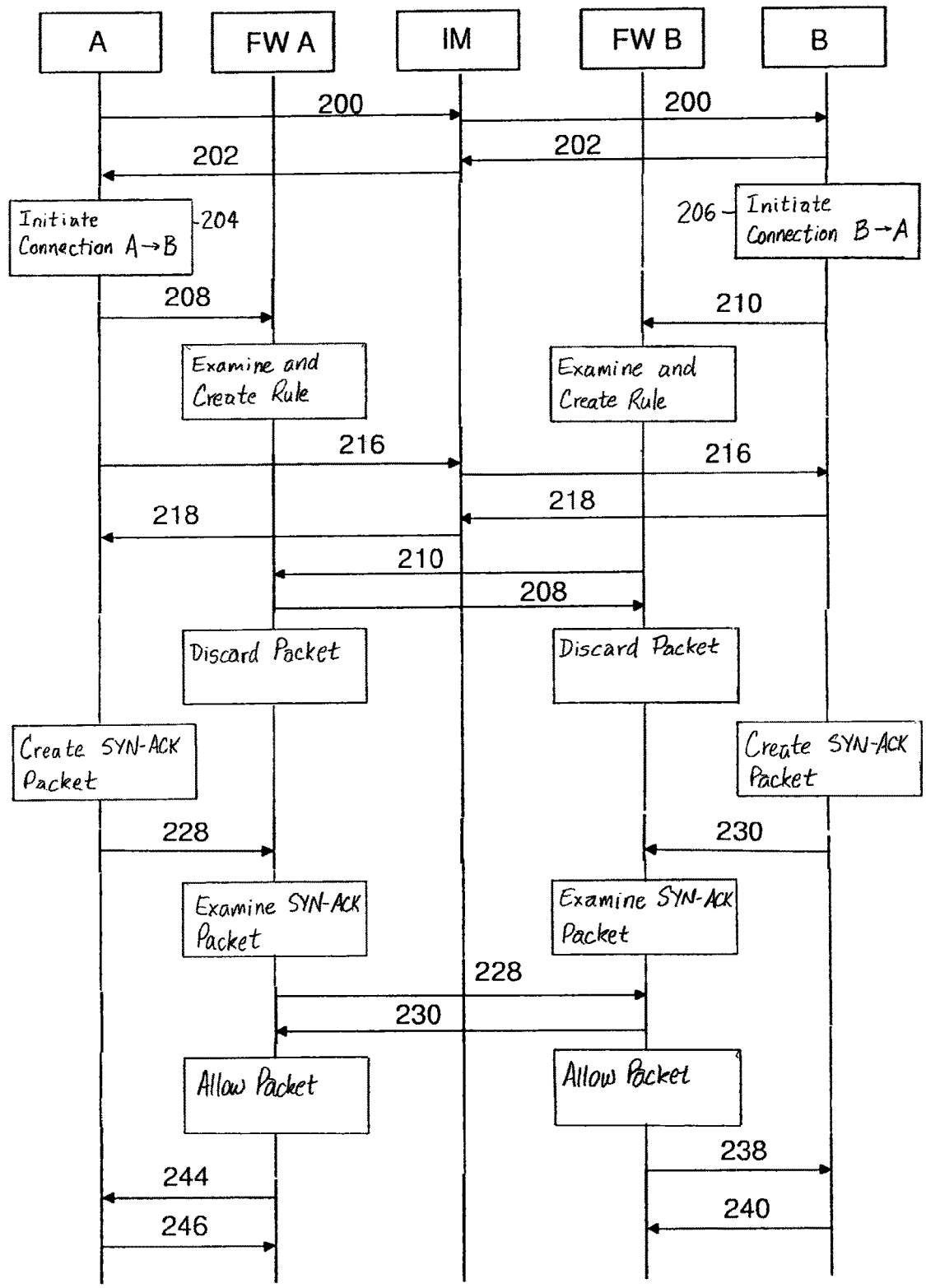

In the following, various embodiments of the invention will be described in more detail with reference to the appended drawings, in which FIG. 1 shows a network arrangement according to an embodiment of the invention;

FIG. 2 shows a signalling chart of a method for establishing a TCP connection according to an embodiment of the invention; and FIG. 3 shows a client terminal according to an embodiment of the invention in a reduced block chart.

DESCRIPTION OF EMBODIMENTS

In the following, the invention will be illustrated by referring to Instant Messaging (IM) services as a preferable framework for the implementation. The invention is, however, not limited to the IM services only, but it can be applied to other similar communication applications, wherein at least two end-users are connected to each other via a centralized directory service. Another examples of such messaging service are the Short Messaging Service (SMS) and the Multimedia Messaging Service (MMS) supported by various mobile communication networks.

Instant Messaging (IM) services have become one of the most popular Internet services of the recent times. Instant Messaging is based on text messages delivered via an IP connection directly between the parties. An IM server only participates in establishing the connection between the parties, but it does not involve in the delivering process of the IM messages by any other means but relaying them further, whereby the messages can be delivered via the IM server with a minimum delay, i.e. almost in real-time. A popular application of IM services is what is known as a chat, wherein a predetermined group of terminal users are communicating with each other such that an IM message sent by one user is delivered to all other terminals belonging to the group. During the establishment of the connection, an IM client in each terminal sends connection information to the IM server, the connection information including an IP address of the terminal and a number of the terminal port assigned to the IM client. The IM server maintains and delivers the necessary connection information to each terminal participating an IM session.

FIG. 1 shows a network arrangement according to a preferred embodiment, wherein two clients, client A (100) and client B (102), connected to a communications network (104) wish to establish a direct connection (106) between each other, for instance, for file transfer or other operations requiring a greater bandwidth. Both clients are protected by stateful firewalls, FW A (108) and FW B (110), and both firewalls are preferably aware of TCP and UDP. The firewalls FW A (108) and FW B (110) are configured in a typical way such that they allow only outbound connections, and no inbound ports are open. Both clients A and B have a connection (112, 114) to an Instant messaging server (IM Server, 116), whereby they can pass each other short messages via the server. However, file transfers or other high-bandwidth operations cannot be carried out via the IM session, since they create too much load.

Now, the IM framework provides useful tools for misleading both the firewalls FW A and FW B, as well as the clients A and B, to believe that, during the establishment of a direct connection between the clients A and B, both the clients A and B, as well as the firewalls FW A and FW B are establishing only an outbound connection, even though a bidirectional connection is actually established. For this purpose, a possibility to send IM messages directly between the clients with a very short delay during the establishment of a direct connection is utilized, which procedure is described further below more in detail.

Another technique utilized herein is so-called raw sockets. As is generally known, a socket can be used in computer networking to form one end of a bidirectional communication link between two programs. In a communication based on a TCP or a UDP protocol, a socket on a certain host is typically defined as the combination of an IP address, a protocol, and a port number. Each socket is bound to a given port, which allows the transport layer protocol to identify, to which application the data should be sent. However, almost all modern operating systems also support so-called raw sockets, which allow the sender to define the data packet header fields, including IP addresses and port numbers, whereby certain operations on a transport layer, like the TCP layer, can be bypassed. Accordingly, raw sockets enable to create a proprietary networking protocol for a specific task.

A method, according to an embodiment, for establishing a direct TCP connection between the clients A and B is further illustrated in a signalling chart of FIG. 2. The operation starts when a first party (client A) sends an IM message (200) to the second party (client B) via the IM server, the IM message indicating the will to establish a direct TCP connection between certain ports of the client hosts. Accordingly, the IM message is a text-based message with a free form, but it should indicate the following idea: "Let's form a TCP connection, my port X, your port Y". The second party (client B)

acknowledges this by sending a free form IM message ("Acknowledged", 202) to the first party (client A) via the IM server.

Then the client A starts a normal TCP connection establishment procedure, wherein the client A initiates on the socket API a bind( ) function, associating the IP address of the client A with a socket, and a connect( ) function, establishing a connection to the specified socket. Thereafter, the TCP connection is initiated from the port X of the host of the client A to the port Y of the host of the client B (204). The client B carries out the same actions to the opposite direction: initiates the bind( ) and the connect( ) functions on the socket API, and then initiates the TCP connection from the port Y of the host of the client B to the port X of the host of the client A (206).

Accordingly, the first handshake message (208) sent by the client A has the form of: TCP packet, source port X, destination port Y, flags SYN, SEQ number I, ACK number 0. Likewise, the first handshake message (210) sent by the client B has the form of: TCP packet, source port Y, destination port X, flags SYN, SEQ number J, ACK number 0. After that the status of the sockets of the both clients A and B is SYN_SENT (Synchronize segment sent).

Then the first handshake message (208) sent by the client A is received at the firewall FW A. The firewall FW A examines (212) the packet and notices that it is a TCP SYN packet going from the client A to the client B. The stateful firewall FW A creates a rule that returns packets with a matching ACK number will be allowed through the firewall. Likewise, the first handshake message (210) sent by the client B is received at the firewall FW B, which examines (214) the packet ("a TCP SYN packet going from the client B to the client A"), and creates a rule that return packets with a matching ACK number will be allowed through the firewall.

After sending the first handshake message, the client A sends an IM message (216) to the client B via the IM server, which IM message indicates that the Synchronize segment is sent and it includes a sequence number "I". Again, the IM message (216) may be of free form, but it should indicate the following idea: "TCP SYN packet sent, SEQ number I". Respectively, the client B sends an IM message (218) to the client A via the IM server: "TCP SYN packet sent, SEQ number J"

Meanwhile, the firewall FW A protecting the host computer of the client A receives first handshake message (210) sent by the client B. However, the properties of the received TCP SYN packet do not match to any allowed rule of the stateful firewall FW A, whereby the firewall FW A decides to discard (220) the packet. Similarly, the firewall FW B discards (222) the TCP SYN packet sent by the client A.

At this stage, thanks to the IM messages (216, 218) sent by the clients A and B to each other, both clients are now aware of the sequence numbers that the other end's firewall expects. This enables both clients to create (224, 226) SYN_ACK packets according to a standard TCP handshake, which SYN_ACK packets are created based on the information received in the IM messages (216, 218) and which SYN_ACK packets match the rules of the both firewalls FW A and FW B. The SYN_ACK packets are created with raw sockets, which allow the clients to specify the data to be included in the packets.

Consequently, the client A creates a SYN_ACK packet comprising the information: TCP packet, source port X, destination port Y, flags SYN+ACK, SEQ number I, ACK number J; this SYN_ACK packet is sent (228) to the client B. Likewise, the client B creates a SYN_ACK packet comprising the information: TCP packet, source port Y, destination port X, flags SYN+ACK, SEQ number J, ACK number I; this SYN_ACK packet is sent (230) to the client A.

Then the SYN_ACK packet sent (228) by the client A is received at the firewall FW A. The firewall FW A examines (232) the packet and notices that it is a solitary TCP SYN_ACK packet going outside the network. The stateful firewall FW A probably cannot create any rule for return packets, since in a standard TCP handshake procedure a SYN_ACK packet should not be originated from the protected client, i.e. from inside the firewall. However, the firewall is configured to pass all outbound connections through, and therefore the SYN_ACK packet is forwarded to the client B. The SYN_ACK packet sent (230) by the client B is also received in the firewall FW B, wherein it is handled (234) in a similar way as described above.

The SYN_ACK packet sent (228) by the client A and forwarded by the firewall FW A is received in the firewall FW B, which notices (236) that a TCP packet from the client A is received, the packet comprising flags SYN+ACK and having an ACK number J. This kind of SYN_ACK packet matches the expected inbound rule, which was previously created in the firewall FW B (214, "return packets to a SYN packet with a matching ACK number will be allowed through the firewall").

Accordingly, the SYN_ACK packet is forwarded (238) to the client B, which replies (240) with an ACK packet according to the standard TCP handshake procedure, wherein the connect( ) function operates as a three-way handshake: a client sends a SYN packet, receives a SYN_ACK packet and finally acknowledges this with an ACK packet. Since the client B now receives a SYN_ACK packet in response to sending a SYN packet, it automatically responds with an ACK packet, even though the SYN_ACK packet has not been created according to a normal connect( ) handshake procedure. Similarly, the SYN_ACK packet sent (230) by the client B and forwarded by the firewall FW B is received in the firewall FW A, which accepts (242) the packet and forwards (244) it to the client A, which replies (246) with an ACK packet.

At this stage, both clients A and B have performed the actions required in the standard TCP handshake procedure, whereby the status of the sockets of the both clients A and B is ESTABLISHED, i.e. a bi-directional TCP connection is established between the clients A and B and the actual file transfer may begin. By creating the SYN_ACK packets with the raw sockets based on the information of the intermediate IM messages, the clients A and B, as well as the firewalls FW A and FW B, have been deluded to misinterpret the situation as they are having only a unidirectional outbound connection. It is important to notice that the clients are operating with their real IP addresses, and no spoofing is required. Consequently, the above-described arrangement is not affected by any anti-spoofing settings in the network.

Accordingly, the embodiments are based on the statefulness of the firewalls, which means that in order to support the embodiments, the firewalls do not require any application-awareness functionality or they do not need to support any firewall controlling protocols, such as UPnP. Thus, the embodiments simplify the implementation of the firewall. The firewalls may be implemented as a program or a hardware device, and they may be operated by a private person or by a network operator.

The client terminals A and B may be a PC-based computers, known as such, connected to any data communication network, or the client terminals A and B may be wireless terminals, like mobile stations or PDA devices, connected to any data communication network via a mobile communication network. Accordingly, the client terminal comprises, as illustrated in FIG. 3, memory MEM, a user interface UI, I/O means I/O for arranging data transmission with other devices, and one or more central processing units CPU comprising at least one processor. The memory MEM includes a non-volatile portion for storing the applications controlling the central processing unit CPU and other data to be stored and a volatile portion to be used for temporary data processing.

The actions of the embodiments are preferably automated in the client terminals to the extent that no user intervention is required during the TCP connection establishment according to the embodiments. The steps according to the embodiments can be largely implemented with program commands executed in the central processing units CPU of the client terminal illustrated in FIG. 3. Thus, said means for carrying out the method described above are preferably implemented as computer software code. The computer software may be stored into any memory means, such as the hard disk of a PC or a CD-ROM disc, from where it can be loaded into the memory of client terminal. The computer software can also be loaded through a network, for instance using a TCP/IP protocol stack. It is also possible to use hardware solutions or a combination of hardware and software solutions for implementing the inventive means.

It is obvious that the present invention is not limited solely to the above-presented embodiments, but it can be modified within the scope of the appended claims.

The invention claimed is:

1. A method for establishing a TCP connection between a first client terminal and a second client terminal, said first client terminal being protected by a first stateful firewall and said second client terminal being protected by a second stateful firewall, and both client terminals comprising means for sending messages to each other via a messaging server; the method comprising:
   agreeing on establishing a TCP connection between the client terminals by sending a message from the first client terminal to the second client terminal via the messaging server using a first communication connection, said message comprising at least port numbers of the client terminals to be used on said connection;
   starting a TCP connection establishment procedure via a second communication connection in both client terminals;
   in response to sending a first handshake message of the TCP connection establishment procedure, sending a message indicating a sequence number of the first handshake message from both client terminals to the opposite client terminal via the messaging server using the first communication connection;
   in response to the firewalls of the opposite client terminals rejecting the first handshake message, creating an acknowledgement message to said first handshake message in both client terminals using a raw socket, the acknowledgement message including the received sequence number as an acknowledgement number; and
   sending the raw socket based acknowledgement message to the opposite client terminal via the second communication connection for a further acknowledgement according to the TCP connection establishment procedure, said acknowledgement completing the establishment of the TCP connection.

2. The method according to claim 1, wherein the first handshake message of the TCP connection establishment procedure is a TCP SYN packet, whereby the method further comprises:
   creating, in the stateful firewalls protecting the client terminals, a rule allowing only a TCP SYN_ACK packet with a corresponding acknowledgement number to be passed through the firewalls in inbound direction.

3. The method according to claim 2, the method further comprising:
   receiving, in the stateful firewalls protecting the client terminals, the raw socket based acknowledgement message sent by the opposite client terminal;
   identifying the acknowledgement message as a TCP SYN_ACK packet; and
   allowing the acknowledgement message to be passed through the firewalls in inbound direction in response to the acknowledgement number of the acknowledgement message corresponding to the sequence number of the TCP SYN packet.

4. A communication system, the system comprising:
   a first client terminal;
   a second client terminal;
   a first stateful firewall protecting said first client terminal;
   a second stateful firewall protecting said second client terminal;
   a messaging server arranged to deliver messages between terminals;
   wherein:
   the client terminals are arranged to agree on establishing a TCP connection between by sending a message from the first client terminal to the second client terminal via the messaging server using a first communication connection, said message comprising at least port numbers of the client terminals to be used on said connection;
   both client terminals are arranged to start a TCP connection establishment procedure via a second communication connection by sending a first handshake message of the TCP connection establishment procedure,
   both client terminals are arranged to send a message indicating a sequence number of the first handshake message to the opposite client terminal via the messaging server using the first communication connection;
   both client terminals are arranged, in response to the firewalls of the opposite client terminals rejecting the first handshake message, to create an acknowledgement message to said first handshake message using a raw socket, the acknowledgement message including the received sequence number as an acknowledgement number; and
   both client terminals are arranged to send the raw socket based acknowledgement message to the opposite client terminal via the second communication connection for a further acknowledgement according to the TCP connection establishment procedure, said acknowledgement completing the establishment of the TCP connection.

5. The communication system according to claim 4, wherein the first handshake message of the TCP connection establishment procedure is a TCP SYN packet, and
   the stateful firewalls protecting the client terminals are arranged to create a rule allowing only a TCP SYN_ACK packet with a corresponding acknowledgement number to be passed through the firewalls in inbound direction.

6. The communication system according to claim 5, wherein the stateful firewalls protecting the client terminals are arranged to receive the raw socket based acknowledgement message sent by the opposite client terminal;
   identify the acknowledgement message as a TCP SYN_ACK packet; and
   allow the acknowledgement message to be passed through the firewalls in inbound direction in response to the acknowledgement number of the acknowledgement message corresponding to the sequence number of the TCP SYN packet.

7. The communication system according to claim 4, wherein the messaging server is an Instant Messaging Server.

8. A client terminal of a telecommunications system, the client terminal being protected by a stateful firewall, and the client terminal comprising means for sending messages to at least a second client terminal via a messaging server; the client terminal further comprising:

means for agreeing on establishing a TCP connection to the second client terminal by exchanging messages via the messaging server using a first communication connection, at least one of said messages comprising at least port numbers of the client terminals to be used on said connection;

means for starting a TCP connection establishment procedure via a second communication connection by sending a first handshake message of the TCP connection establishment procedure;

means for sending a message indicating a sequence number of the first handshake message to the second client terminal via the messaging server using the first communication connection;

means for receiving, via the messaging server, a message indicating a sequence number of the first handshake message sent by the second client terminal;

means for creating an acknowledgement message to said first handshake message sent by the second client terminal using a raw socket, the acknowledgement message including the received sequence number as an acknowledgement number;

means for sending the raw socket based acknowledgement message to the second client terminal via the second communication connection;

means for receiving a raw socket based acknowledgement message from the second client terminal via the second communication connection, said acknowledgement message including the sequence number of the first handshake message sent to the second client terminal; and means for sending an acknowledgement to the received raw socket based acknowledgement message via the second communication connection, said acknowledgement completing the establishment of the TCP connection.

9. The client terminal according to claim 8, wherein said means for sending messages to at least a second client terminal via a messaging server comprise an Instant Messaging client application.

10. A computer program product, stored on a non-transitory computer readable medium and executable in a data processing device, for establishing a TCP connection, wherein the computer program product comprises:

a computer program code section for agreeing on establishing a TCP connection to the second client terminal by exchanging messages via the messaging server using a first communication connection, at least one of said messages comprising at least port numbers of the client terminals to be used on said connection;

a computer program code section for starting a TCP connection establishment procedure via a second communication connection by sending a first handshake message of the TCP connection establishment procedure;

a computer program code section for sending a message indicating a sequence number of the first handshake message to the second client terminal via the messaging server using the first communication connection;

a computer program code section for receiving, via the messaging server, a message indicating a sequence number of the first handshake message sent by the second client terminal;

a computer program code section for creating an acknowledgement message to said first handshake message sent by the second client terminal using a raw socket, the acknowledgement message including the received sequence number as an acknowledgement number;

a computer program code section for sending the raw socket based acknowledgement message to the second client terminal via the second communication connection;

a computer program code section for receiving a raw socket based acknowledgement message from the second client terminal via the second communication connection, said acknowledgement message including the sequence number of the first handshake message sent to the second client terminal; and a computer program code section for sending an acknowledgement to the received raw socket based acknowledgement message via the second communication connection, said acknowledgement completing the establishment of the TCP connection.

11. A stateful firewall arranged to protect at least one client terminal, the firewall including:

means for receiving an outbound handshake message of the TCP connection establishment procedure from the client terminal;

means for creating a rule allowing only a TCP packet with an acknowledgement number corresponding to a sequence number of the outbound handshake message to be passed through the firewall in an inbound direction;

means for receiving the raw socket based acknowledgement message sent by another client terminal; and means for allowing the acknowledgement message to be passed through the firewall in the inbound direction in response to the acknowledgement number of the acknowledgement message corresponding to the sequence number of the outbound handshake message.

* * * * *